(12) United States Patent
Chun

(10) Patent No.: US 10,083,181 B2
(45) Date of Patent: Sep. 25, 2018

(54) METHOD AND SYSTEM FOR STORING METADATA OF LOG-STRUCTURED FILE SYSTEM

(71) Applicant: ELECTRONICS AND TELECOMMUNICATIONS RESEARCH INSTITUTE, Daejeon (KR)

(72) Inventor: Han Sung Chun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 115 days.

(21) Appl. No.: 15/252,675

(22) Filed: Aug. 31, 2016

(65) Prior Publication Data
US 2017/0255636 A1 Sep. 7, 2017

(30) Foreign Application Priority Data
Mar. 2, 2016 (KR) .................. 10-2016-0025336

(51) Int. Cl.
G06F 3/06 (2006.01)
G06F 12/02 (2006.01)
G06F 17/30 (2006.01)

(52) U.S. Cl.
CPC ........ G06F 17/30082 (2013.01); G06F 3/061 (2013.01); G06F 3/064 (2013.01);
(Continued)

(58) Field of Classification Search
CPC combination set(s) only.
See application file for complete search history.

(56) References Cited

U.S. PATENT DOCUMENTS

| 7,383,286 B2* | 6/2008 | Hamanaka ........ G06F 17/30067 707/694 |
| 2005/0071537 A1* | 3/2005 | New ..................... G06F 3/0608 711/100 |

(Continued)

FOREIGN PATENT DOCUMENTS

KR  10-2014-0042419 A  4/2014

OTHER PUBLICATIONS

Mendel Rosenblum et al., "The Design and Implementation of a Log-Structured File System", ACM Transactions on Computer Systems (TOCS), vol. 10, Issue 1, pp. 26-52, Feb. 1992.
(Continued)

Primary Examiner — Aracelis Ruiz
(74) Attorney, Agent, or Firm — LRK Patent Law Firm

(57) ABSTRACT

A method, system and computer-readable recording medium for storing metadata of a log-structured file system. The method includes receiving a block management request signal including information about a block number and indicating whether it is an allocation request or a deallocation request for a block, calculating a segment number to which the block belongs with reference to the block number, obtaining a metadata segment usage (MSU) item corresponding to the segment number, wherein the metadata segment usage (MSU) item includes information about a segment number and a number of valid blocks, and increasing the number of valid blocks of the metadata segment usage (MSU) item by one when the block management request signal corresponds to the allocation request, and decreasing the number of valid blocks of the metadata segment usage (MSU) by one item when the block management request signal corresponds to the deallocation request.

12 Claims, 9 Drawing Sheets

(52) U.S. Cl.
CPC .......... *G06F 3/0604* (2013.01); *G06F 3/0631* (2013.01); *G06F 3/0643* (2013.01); *G06F 3/0659* (2013.01); *G06F 3/0679* (2013.01); *G06F 12/0246* (2013.01); *G06F 17/30218* (2013.01); *G06F 2212/1016* (2013.01); *G06F 2212/214* (2013.01); *G06F 2212/7202* (2013.01); *G06F 2212/7207* (2013.01)

(56) References Cited

U.S. PATENT DOCUMENTS

| | | |
|---|---|---|
| 2007/0143286 A1 | 6/2007 | Kim et al. |
| 2011/0022778 A1* | 1/2011 | Schibilla ............. G06F 12/0246 711/103 |
| 2014/0095556 A1 | 4/2014 | Lee et al. |
| 2014/0181439 A1* | 6/2014 | Moon .................. G06F 3/0683 711/162 |
| 2015/0254013 A1 | 9/2015 | Chun |

OTHER PUBLICATIONS

Changman Lee et al., "F2FS: A New File System for Flash Storage", 13th USENIX Conference on File and Storage Technologies (Fast '15), pp. 273-286, Feb. 16, 2015.

\* cited by examiner

FIG. 4

| INODE NUMBER(ino) | INODE BLOCK NUMBER(iblock) |
|---|---|

FIG. 5

INDEX

| | | |
|---|---|---|
| 0 | INODE NUMBER | INODE BLOCK NUMBER |
| 1 | INODE NUMBER | INODE BLOCK NUMBER |
| 2 | INODE NUMBER | INODE BLOCK NUMBER |

⋮

| | | |
|---|---|---|
| N | INODE NUMBER | INODE BLOCK NUMBER |

FIG. 6

| NUMBER OF VALID BLOCKS(valid_blocks) |
|---|

| INDEX | |
|---|---|
| 0 | NUMBER OF VALID BLOCKS |
| 1 | NUMBER OF VALID BLOCKS |
| 2 | NUMBER OF VALID BLOCKS |
| ⋮ | |
| N | NUMBER OF VALID BLOCKS |

| SEGMENT NUMBER(sno) | NUMBER OF VALID BLOCKS(valid_blocks) |
|---|---|

METHOD AND SYSTEM FOR STORING METADATA OF LOG-STRUCTURED FILE SYSTEM

CROSS-REFERENCE TO RELATED APPLICATION

The present application claims priority to Korean patent application number 10-2016-0025336 filed on Mar. 2, 2016, the entire disclosure of which is incorporated herein in its entirety by reference.

BACKGROUND

1. Field of Invention

Various embodiments of the inventive concept of the present disclosure relate to a method and system for storing metadata of a log-structured file system.

2. Description of Related Art

A NAND flash memory is widely used as a storage device in an embedded system because of low cost, low power consumption, small size and high impact resistance. A NAND flash memory has very different characteristics from a disk, which is a typical storage device, and there are many limitations to its usage. In particular, it is basically impossible to perform an in-place update of a flash memory due to the erase-before-write limitation.

Recently, to overcome the limitations of the NAND flash memory, storage devices manufactured by combining a controller for driving a flash translation layer (FTL) and a flash memory have been in widespread use. Such storage device is called an FTL-based storage device, for example, a SSD, a USB memory, and an SD card. When an FTL is present under a file system, a storage device may work properly since the FTL performs an in-place update. However, costs for performance necessary for the FTL to perform the in-place update may also be increased.

SUMMARY

Various embodiments of the present disclosure are to solve the foregoing related art problems.

Another embodiment of the present disclosure is to efficiently manage metadata and the burden of a storage device by recording only changes without causing an in-place update when storing metadata in a log-structured file system.

According to an embodiment, there is provided a method of storing metadata of a log-structured file system, the method including receiving a block management request signal including information about a block number and indicating whether it is an allocation request or a deallocation request for a block, calculating a segment number to which the block belongs with reference to the block number, obtaining a metadata segment usage (MSU) item corresponding to the segment number, wherein the metadata segment usage (MSU) item includes information about a segment number and a number of valid blocks, and increasing the number of valid blocks of the metadata segment usage (MSU) item by one when the block management request signal corresponds to the allocation request, and decreasing the number of valid blocks of the metadata segment usage (MSU) by one item when the block management request signal corresponds to the deallocation request.

According to another embodiment, there is provided a system for storing metadata of a log-structured file system, the system including a data input/output module transferring a block allocation request or a block deallocation request when receiving a data write request or a metadata write request, a space management module processing the block allocation or deallocation request after determining whether the block allocation or deallocation request is made in response to the data write request or the metadata write request when receiving the block allocation or deallocation, request from the data input/output module, and a metadata segment usage processing module updating segment information corresponding to a metadata file whenever the space management module processes allocation or deallocation of a block in response to the metadata write request.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, of one or more intervening elements may also be present. Like reference numerals refer to like elements throughout.

FIG. 4 is a diagram illustrating the structure of segment summary according to an embodiment.

FIG. 5 is diagram illustrating the structure of a segment summary area according to an embodiment.

FIG. 6 is a diagram illustrating the structure of segment usage according to an embodiment.

DETAILED DESCRIPTION

Figure 1:
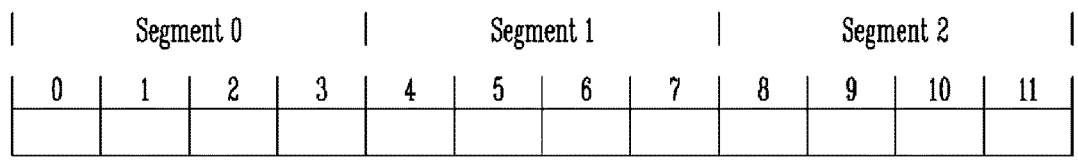
FIG. 1 is a diagram illustrating the structure of a storage space according to an embodiment.

In the following detailed description, reference is made to the accompanying drawings that show, by way of illustration, the specific embodiments which may be practiced. These embodiments are described in sufficient detail to enable those skilled in the art to practice the embodiments. Hereinafter, preferred embodiments of the present invention will be described with reference to the accompanying drawings to fully explain the present invention in such a manner that it may easily be earned out by a person wish ordinary skill in the art to which the present invention pertains. It is to be understood that the various embodiments, although different, are not necessarily mutually exclusive. For example, a particular feature, structure, or characteristic described herein, in connection with one embodiment may be implemented within other embodiments without departing from their spirit and scope. In addition, it is to be understood that the location or arrangement of individual elements within each disclosed embodiment may be modified without departing from their spirit and scope. The following detailed description is, therefore, not to be taken in a limiting sense, and the scope of the embodiments is defined only by the appended claims, appropriately interpreted, along with the full range of equivalents to which the claims are entitled In the drawings, like numerals refer to the same or similar functionality throughout the several views.

Hereinafter, preferred embodiments of the present invention will be described with reference to the accompanying drawings to fully explain the present invention in such a manner that it may easily be carried out by a person with ordinary skill in the art to which the present invention pertains.

As described above, there are many limitations to using a NAND flash memory, including, most notably the following:

A NAND flash memory may include a plurality of erase blocks, and each of the erase blocks may include a plurality of pages. For example, each of the pages of a single level cell (SLC) large Block NAND flash memory may have a size of 2 KB. A single erase block may include 64 pages and have a size of 128 KB. A flash memory may perform three operations including a read operation, a write operation and an erase operation. Read and write operations may be performed in units of pages, and an erase operation may be performed in units of erase blocks. Therefore, even when data having a smaller size than a single page is used, the same amount of time may be consumed as if one page is used.

As described above, since an erase operation may be performed in units of erase blocks, to re-use a page, the entire erase block to which the corresponding page belongs is to be erased. An erase operation may consume more time than a read of write operation. In addition, since each erase block has a limited number of erase cycles, the corresponding erase block may not be used any longer when the limit is reached.

The erase block which is no longer usable may be called a bad block. By evenly selling the number of erase operations performed by each of the erase blocks, the generation of a bad block may be prolonged as much as possible. Such technique is called wear leveling.

When a large block NAND flash memory is used, pages in an erase block may be sequentially used. In other words, the pages may be used in order of a page 0, a page 1, and a page 2. To use a particular page, a write operation is necessarily performed on preceding pages.

Since a log-structured file system may not perform an in-place update to record data, the above-described limitations of the flash memory may be avoided. Therefore, it may be appropriate to use the log-structured file system in the flash memory.

[Preferred Embodiment of the Invention]

According to the present disclosure, a storage space may be managed in units of segments and blocks. FIG. 1 is a diagram illustrating the structure of a storage space according to an embodiment.

Referring to FIG. 1, the storage space may be divided into segments, and each of the segments may include a plurality of blocks. The size of the segment and the size of the block, may be arbitrarily set. For example, she block may have a size of 2 KB and the segment may have a size of 128 KB.

According to an embodiment, a separate file for storing metadata may be provided (hereinafter, referred to as "metadata file").

Figure 2:
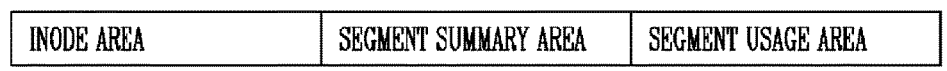
FIG. 2 is a diagram illustrating a metadata file structure according to an embodiment.

FIG. 2 is a diagram illustrating a metadata file structure according to an embodiment. As illustrated in FIG. 2, the metadata file may necessarily include 'inode', 'segment summary' and 'segment usage' areas. However, for convenience of explanation, in FIG. 2, the areas of the metadata file may be placed in order of 'inode', 'segment summary' and 'segment usage.' However, the invention is not limited thereto. The order of the areas in the metadata file and information configuration of each area may be modified.

In the present disclosure, the term 'inode' is used in a file system of a Unix/Linux system and refer to a document type containing various types of metadata which allow access to a particular file. Each file may include an inode. In general, the inode contain information about a file size, access authority, and generation/correction time, and addresses of data blocks forming the files.

An inode pointer structure may be used to include the addresses of the data blocks.

Figure 3:
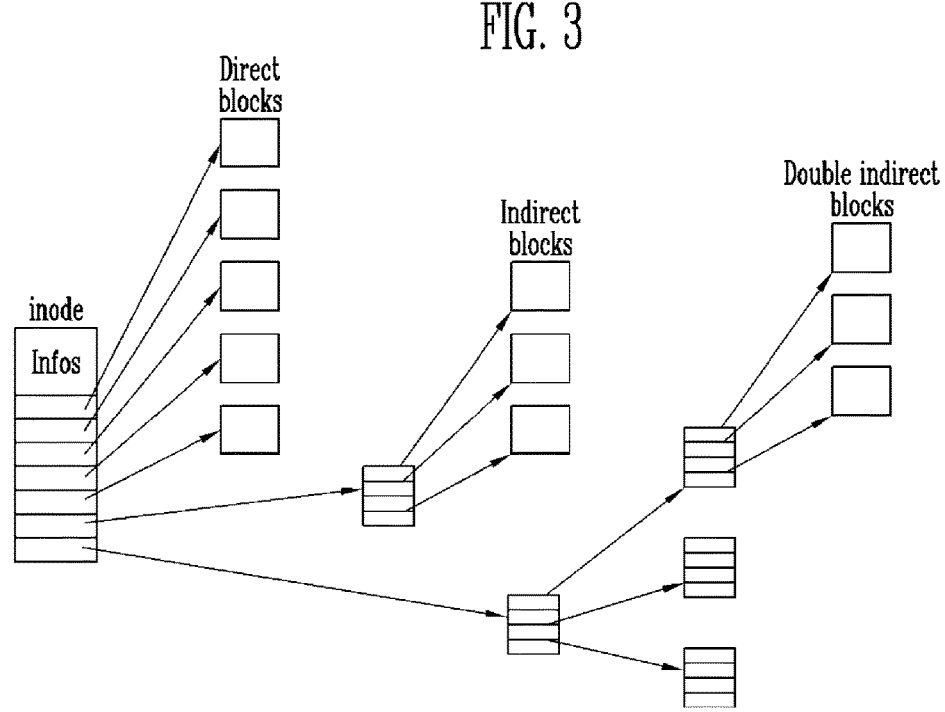
FIG. 3 is a diagram illustrating an in ode pointer structure according to an embodiment.

FIG. 3 is a diagram illustrating an inode pointer structure according to an embodiment. Referring to FIG. 3, each inode may include a pointer including addresses of blocks belonging to the corresponding inode. More specifically, top five pointers may directly have block addresses, and the sixth pointer may have a plurality of block addresses. Data blocks corresponding to these block addresses may be called indirect blocks. The last pointer may include block addresses of blocks that bypass twice, i.e., double indirect blocks. In the present disclosure, an inode pointer may be included in an inode.

An inode area may be configured such that when a predetermined inode number is given, an inode corresponding thereto may be found. A method of configuring the inode area may not be limited. For example, the inode area may be configured in a table format in which addresses of blocks including modes are arranged, or in an inode table format in which modes are sequentially arranged.

In the present disclosure, segment summary (SS) may refer to which inode a particular block belongs to and in what order the particular block is.

FIG. 4 is a diagram illustrating the structure of segment summary according to an embodiment. Referring to FIG. 4, the segment summary may be configured to include information about inode numbers and inode block numbers.

Even when a particular block is selected as a cleaning target during a segment cleaning operation and moved to another segment, the particular block may maintain the connection with the original inode on the basis of segment summary. Segment summary corresponding to each block may be included in the metadata file. An inode number may indicate which inode the corresponding block belongs to. The inode block number may indicate what order the corresponding block is in, among blocks forming the inode.

FIG. 5 is a diagram illustrating the structure of a segment sum man area according to an embodiment. Referring to FIG. 5, the segment summary area may refer to a table showing segment summary with respect to all blocks existing in the storage space.

According to an embodiment, segment summary items may be sequentially arranged in the segment summary area of the metadata file. Therefore, the order in which these items are arranged may be an index. The index may correspond to a block number.

In the present disclosure, segment usage (SU) may refer to information used during the segment cleaning operation. In other words, a particular segment may be selected with reference to the segment usage.

FIG. 6 is a diagram illustrating the structure of segment usage according to an embodiment. Referring to FIG. 6, the segment usage may include information about the number of valid blocks (valid_blocks). Segment usage corresponding to each segment may be included in the metadata file. The number of valid blocks may refer to information about the number of blocks which are actually allocated to a file in the corresponding segment and used.

Figures 7, 8, 9:
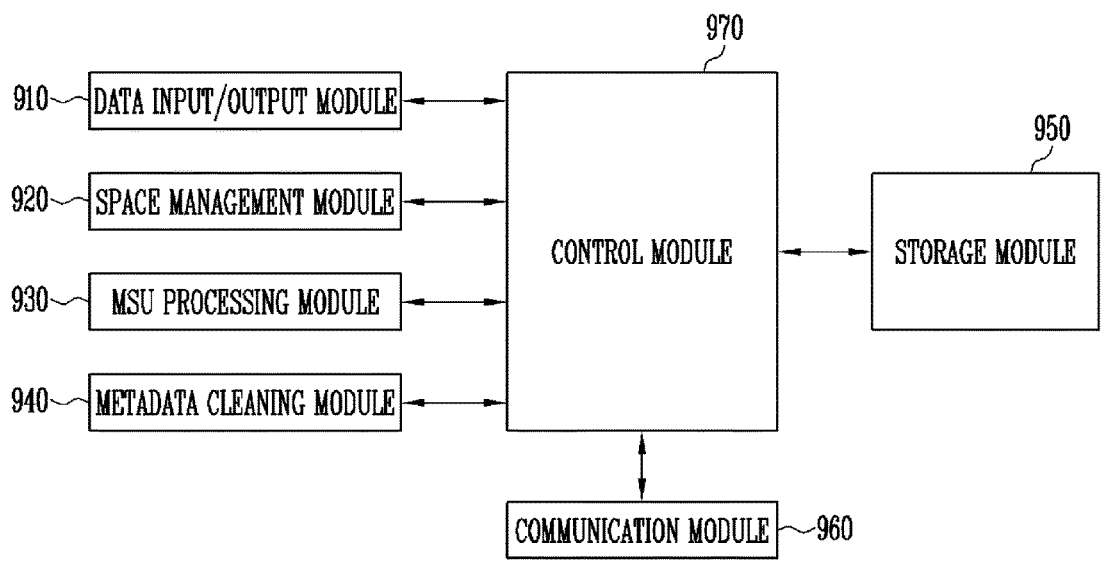
FIG. 7 is a diagram illustrating the structure of a segment usage area according to an embodiment.
FIG. 8 is a diagram illustrating the structure of metadata segment usage according to an embodiment.
FIG. 9 is a diagram illustrating the internal configuration of a system for storing metadata in a log-structured file system according to an embodiment.

FIG. 7 is a diagram illustrating the structure of a segment usage area. Referring to FIG. 7, the segment usage area may refer to a table showing segment usage items with respect to all segments existing in a storage space.

According to an embodiment, segment usage items may be sequentially arranged in the segment usage area of the metadata file, and the order in which these items are arranged may be an index. The index may correspond to a segment number.

In the present specification, metadata segment usage (MSU) may refer to a document type showing usage of a particular segment belonging to a metadata file.

FIG. 8 is a diagram illustrating the structure of metadata segment usage according to an embodiment. Referring to FIG. 8, the metadata segment usage may include information about segment numbers (sno) and the number of valid blocks (valid_blocks). Metadata, segment usage may correspond to each segment of the metadata file.

In the present disclosure, a checkpoint may refer to information necessary to restore metadata for driving a file system.

The checkpoint may include information about an in ode for a metadata file, an MSU list, and the number of MSU items included in the MSU list.

According to an embodiment, since all metadata are included in the metadata file, the mode for the metadata file may be included in the checkpoint.

In addition, according to an embodiment, MSU items may be present with respect to only the segment including blocks belonging to the metadata file. A table in which the MSU items are arranged may correspond to the MSU list. The number of MSU items may refer to the number of MSU items included in the table. In addition, a checkpoint area may refer to an area where the checkpoint is recorded.

Hereinafter, a system for storing metadata in a log-structured file system according to an embodiment will be described in detail.

Configuration of a System for Storing Metadata in a Log-structured File System

FIG. 9 is a diagram illustrating the internal configuration of a system storing metadata in a log-structured file system according to an embodiment.

As illustrated in FIG. 9, a system according to an embodiment may include a data-input/output module 910, a space management module 920, an MSU processing module 930, a metadata cleaning module 940, a storage module 950, a communication module 960 and a control module 970.

According to an embodiment, at least one of the data input/output module 910, the space management module 920, the MSU processing module 930, the metadata cleaning module 940, the storage module 950, the communication module 960 and the control module 970 may be a program module which communicates with an external terminal device (not illustrated) or a server (not illustrated). The program module may be included as an operating system, an application program module, or another program module, in a system for storing metadata in a log-structured tile system. Physically, the program module may be stored in various known storage devices. In addition, this program module may be stored in a remote memory performing communication with the system for storing the metadata in the log-structured file system. In addition, the program module may include, but not limited to, routines, subroutines, programs, objects, components, data structures and the like for performing specific tasks or executing specific abstract data types as will be described below in accordance with the present invention.

First when the log-structured file system receives a ready write request, the data input/output module 910 may search, for an inode corresponding to a file and a block corresponding thereto. More specifically, when a data write request occurs, the data input/output module 910 may be allocated a new block regardless of whether or not the existing block is present with respect to a corresponding portion of the file, and store write data in the block (out-of-place update).

In particular, according to an embodiment, the data, input/output module 910 may send a block allocation or deallocation request to the space, management module20 to be described below. When the data input/output module 910 sends the block allocation request to the space management module 920, the data input/output module 910 may also transfer segment summary containing information about an inode number and an inode block number. When the block deallocation request is sent, the data input/output module 910 may transfer a number of a block to deallocate.

Figure 10:
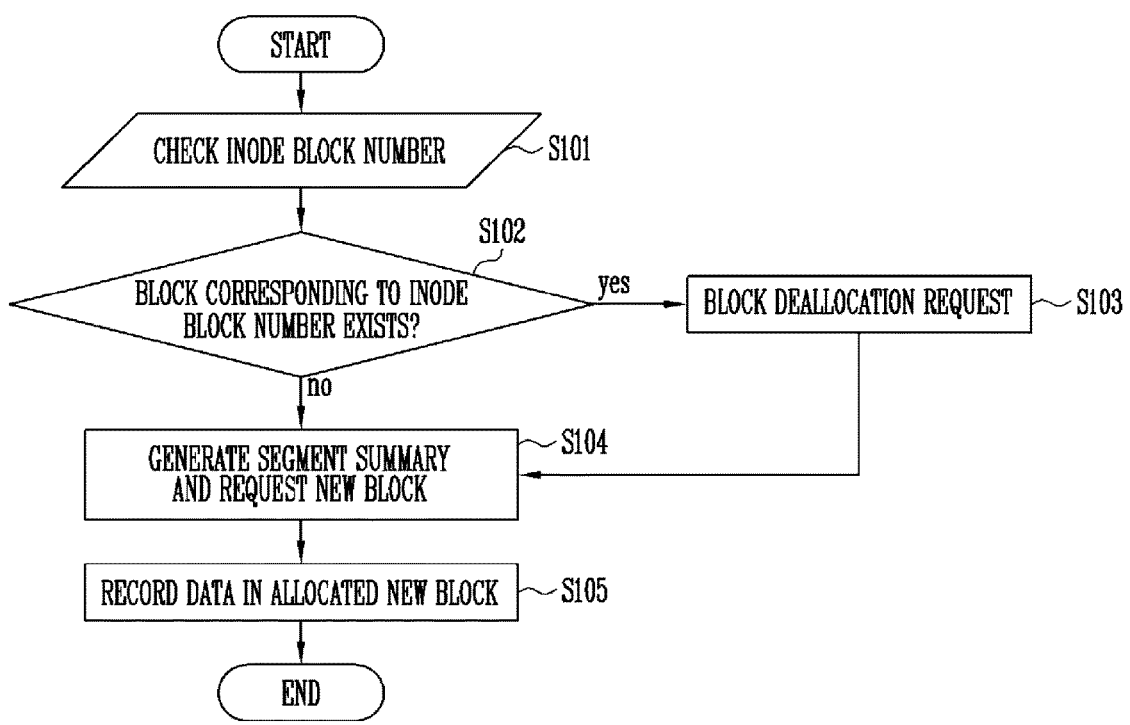
FIG. 10 is a diagram illustrating main processes performed by the data input/output module according to an embodiment.

FIG. 10 is a diagram illustrating main processes performed by the data input/output module 910 according to an embodiment.

First, at step S101, an inode block number may be checked. When it is determined that a block corresponding to the inode block number exists at step S102, deallocation of the corresponding block may be requested at step S103. Subsequently, at step S104, segment summary may be generated and allocation of a new block may be requested.

On the other hand, when it is determined that there is no block corresponding to the inode block number, segment summary may be generated and a new block may be requested at step S104. After step S104 is performed, data may be recorded in the allocated new block at step S105.

Subsequently, according to an embodiment, the space management module 920 may respond to the block allocation or deallocation request from the data input/output module 910.

First, a block allocation process by the space management module 920 will be described in detail. The block allocation process may include allocating a block and reflecting an allocation result in segment summary and segment usage.

Figure 11:
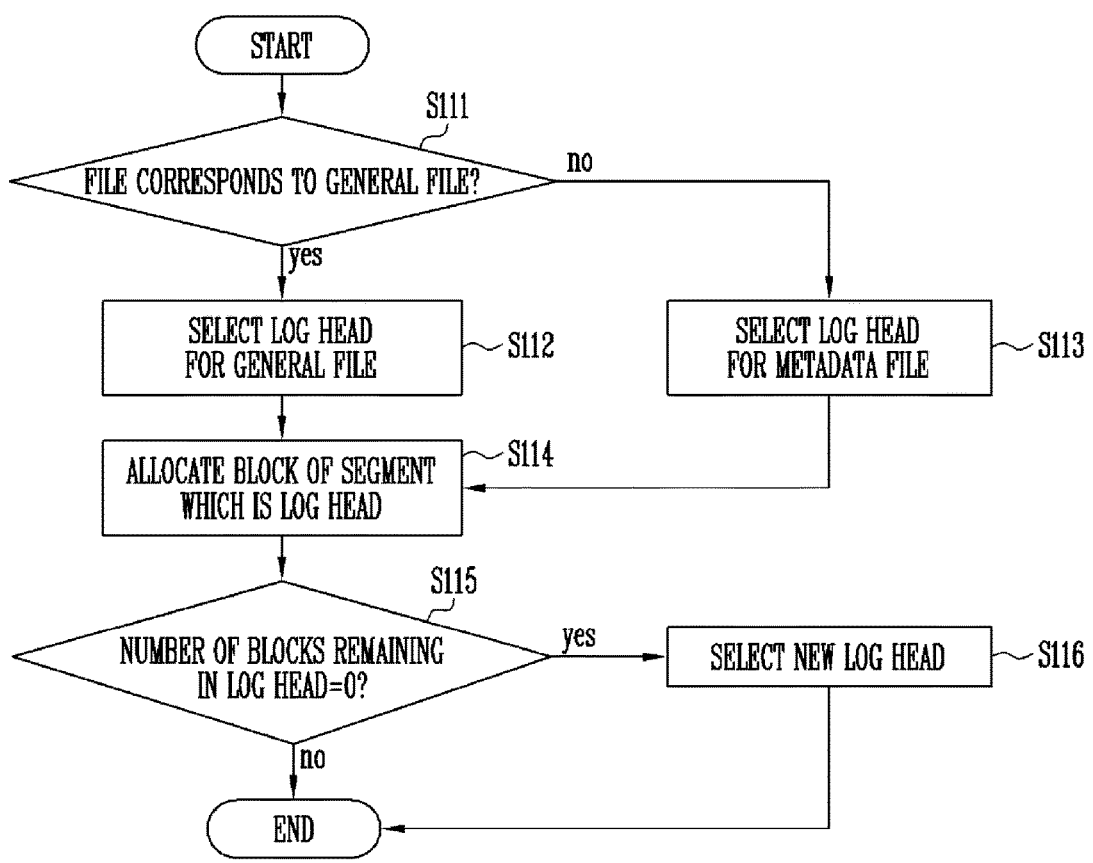
FIGS. 11 to 13 are diagrams illustrating main processes performed by a space management module according to an embodiment.

FIG. 11 is a diagram illustrating a block allocation process by a space, management module.

Referring to FIG. 11, it may be determined whether a file for a block allocation request is a general file or a metadata file at step S111. The space management module 920 may also receive segment summary including an inode number from the data input/output module 910. When the mode number is a number for the metadata file, it may be determined that the file is the metadata file, and otherwise, that the file is the general file.

When it is determined that the file is the general file, a log head for the general file may be selected at step S112. The log head may refer to a segment that is currently used for allocation. In other words, when a new log head is selected, one of empty segments may be selected and the selected segment may be the log head.

On the other hand, when it is determined that when the tile for the allocation request is the metadata file, a log head for the metadata file may be selected at step S113. In other words, a log head for storing a metadata file may be separately used to prevent blocks of the metadata file and blocks of the general file from being mixed with each other in the same segment. Therefore, at least two log heads may be provided.

When the log head for the general file or the metadata tile is selected, a block may be allocated from a segment which is the log head at step S114. More specifically, the first block of the segment, which is the log bead, may start to be used for allocation in response to each allocation request.

Subsequently, the number of blocks remaining in the log head may be determined at step S115. When there are no available blocks in the log head after the block allocation process is completed, a new log head may be selected to prepare for a segment prior to the next allocation request at step S116.

When the block allocation process is completed as described above, since the allocated block belongs to a predetermined file, this may be reflected in the segment summary, and a decrease in the number of blocks available in the segment, to which the allocated block belongs, by one may be reflected in the segment usage.

Figure 12:
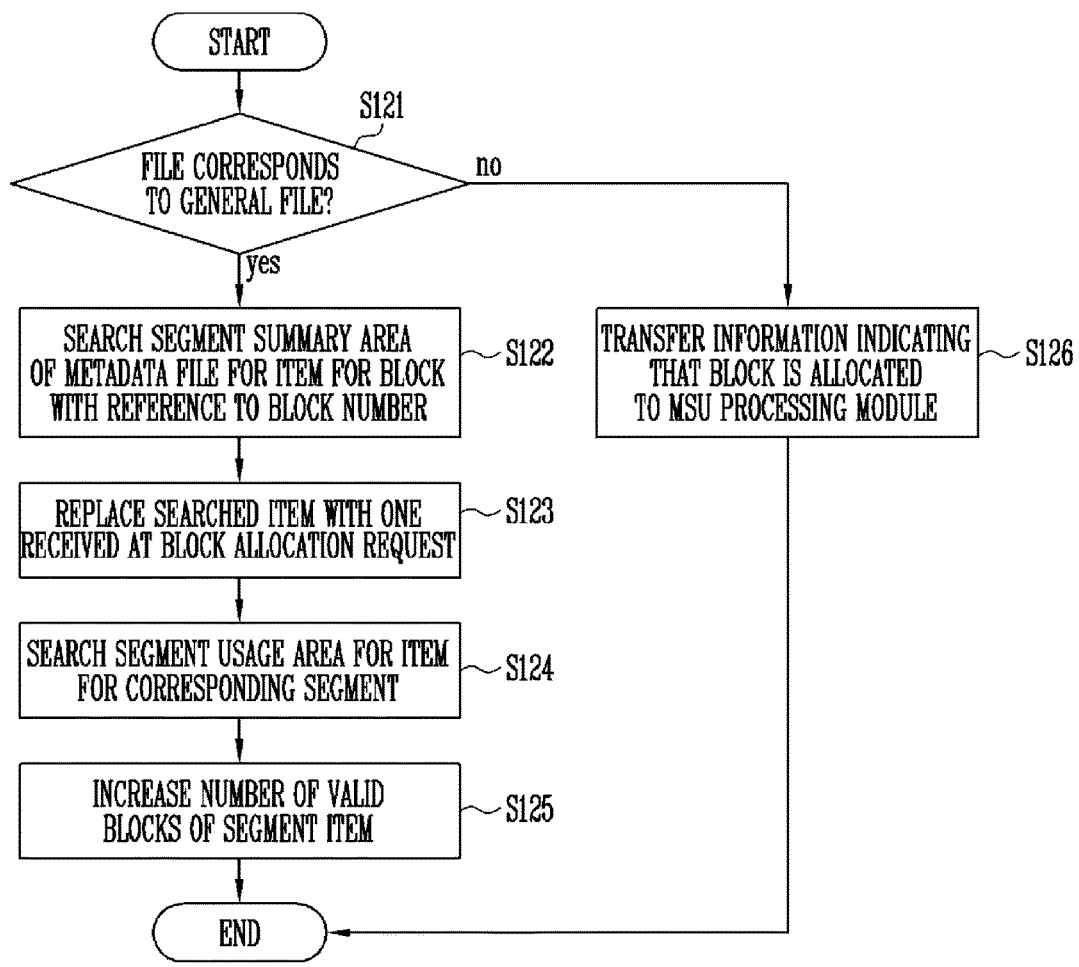

FIG. 12 is a diagram illustrating main processes performed by a space management module according to an embodiment.

Referring to FIG. 12, it may be determined whether a file for a block allocation request is a general file or a metadata file at step S121.

When the file for the block allocation request is the general file a segment summary area of a metadata file may be searched for an item for an allocated block with reference to a block number of the allocated block at step S122. The block number may serve as a table index of the segment summary area.

Subsequently, at step S123, the searched item may be replaced by one received at the block allocation request. At step S124, the segment usage area may be searched for an item for the corresponding segment on the basis of the segment number to which the allocated block belongs. The segment number may be acquired by referring to a block number and the number of blocks constituting a single segment.

Subsequently, at step S125, the number of valid blocks of the corresponding segment item found at step S124 may be increased by one.

However, when it is determined that the file for the block allocation request corresponds to the metadata tile at step S121, information indicating that the block is allocated may be transferred to the MSU processing module 930 at step S126. The information may include the corresponding block number.

Hereinafter, a block deallocation process by a space management module will be described in detail.

Figure 13:
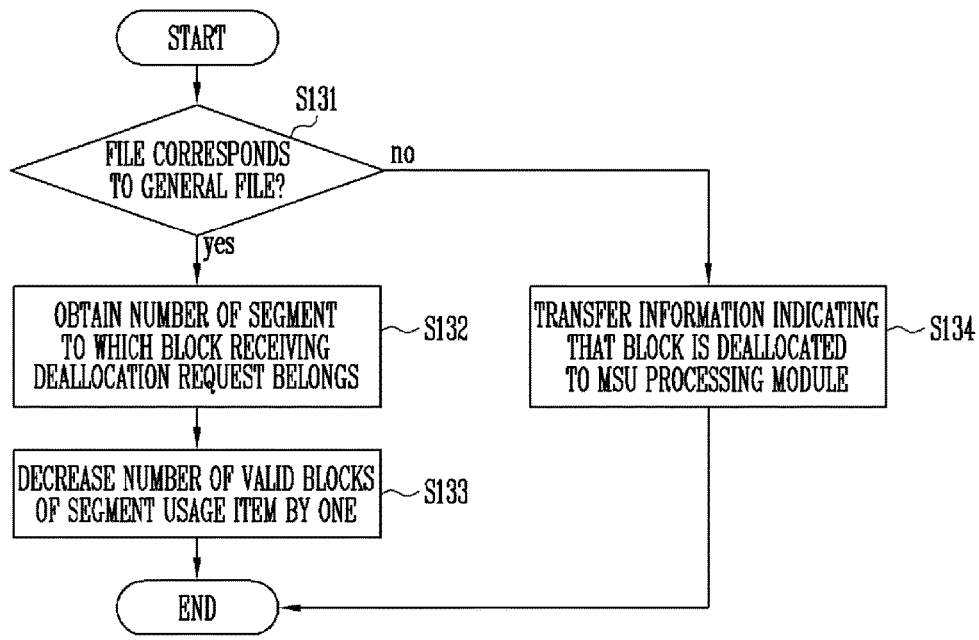

FIG. 13 is a diagram illustrating a block deallocation process by a space management module according to an embodiment.

Referring to FIG. 13, it may be determined whether a file for requesting a block deallocation is a general file or a metadata file at step S131. When it is determined that the block deallocation request is made for the general file, a number of a segment belonging to a block receiving the deallocation request may be obtained at step S132. The number of the segment may be obtained with reference to the number of the block receiving the deallocation request and the number of blocks included in a single segment. When the number of the segment is obtained, a segment usage item corresponding to the obtained segment number may be obtained. Subsequently, the number of valid blocks of the corresponding segment usage item obtained at step S133 may be decreased by one.

However, when the block deallocation request is made for a block included in the metadata file at step S131, information indicating that the block is deallocated may be transferred to the MSU processing module 930 at step S134. The information may include the corresponding block number.

Subsequently, according to an embodiment, the MSU processing module 930 may manage a segment corresponding to each metadata file. More specifically, when a predetermined segment starts to include blocks belonging to the metadata file, the MSU processing module 930 may add the corresponding segment to a list. When all the blocks of the metadata file are deallocated, the corresponding segment may be removed from the list.

The MSU processing module 930 may obtain processing information from the space management module 920 whenever allocation or deallocation of blocks belonging to the metadata file is processed.

As described above, the MSU item max exist in the segment including the blocks belonging to the metadata file, and the MSU item may also be removed from the segment when all the blocks of the metadata file belonging to the segment are eliminated by the block deallocation.

In the present disclosure, MSU items collected at a checkpoint so as to be recorded in a predetermined storage module may be referred to as an 'MSU list,' and MSU items collected in a memory for the MSU processing module 930 to process the MSU list may be referred to as a 'in-memory MSU list.' According to an embodiment, an arbitrary data structure may be used to process the in-memory MSU list, for example, a circular doubly linked list may be used. Hereinafter, a description will be made on the assumption that the circular doubly linked list is used.

Figure 14:
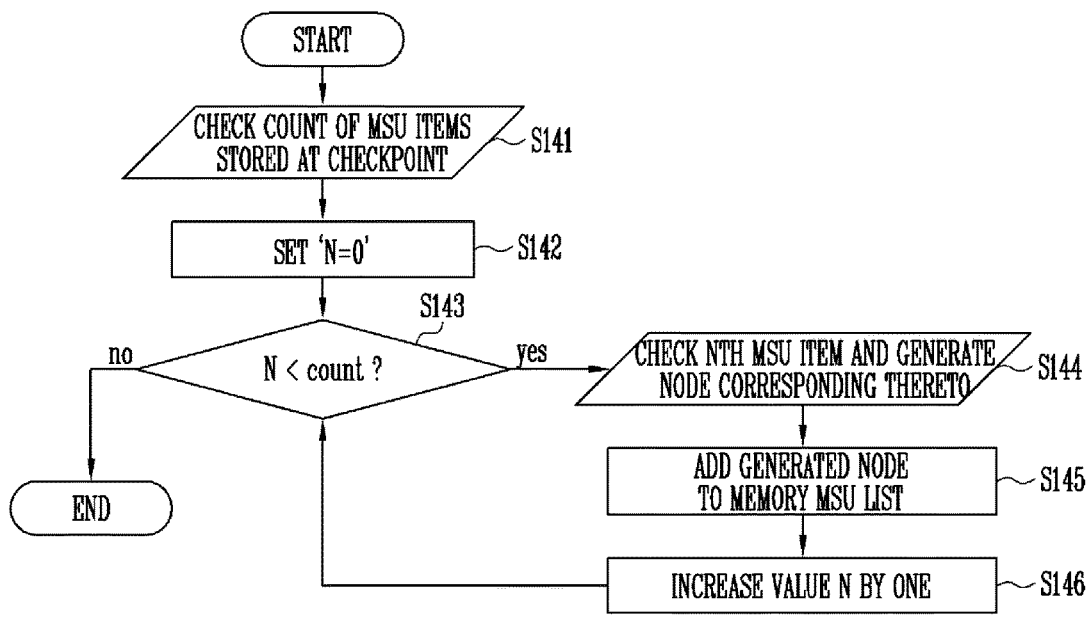
FIGS. 14 to 16 are diagrams illustrating main processes performed by an MSU processing module according to an embodiment.

FIG. 14 is a diagram illustrating processes in which an MSU processing module configures a in-memory MSU list according to an embodiment.

First, at step S141, a count corresponding to the number of MSU items stored at a checkpoint may be checked.

Subsequently, at step S142, 'N=0' may be set, and a value N and the count of the MSU items may be compared at step S143. Steps S144 to S146 may be repeated until the value N is less than the count of the MSU items cheeked at step S141. In other words, steps S144 to S146 may be repeated as many as the count of the MSU items checked at step S141.

At step S144, an nth MSU item may be read and a node corresponding thereto may be generated. At step S145, the generated node may be added to the in-memory MSU list. Subsequently, at step S146, the value N may be increased by one. The process flow proceeds back to step S143.

According to an embodiment, she MSU processing module 930 may correct the MSU item with reference to the information transferred from the space management module 920.

When receiving a block allocation or deallocation request for the metadata file, the space management module 920 may transfer a block number and information indicating whether the corresponding request is an allocation request or a deallocation request to the MSU processing module 930.

Figure 15:
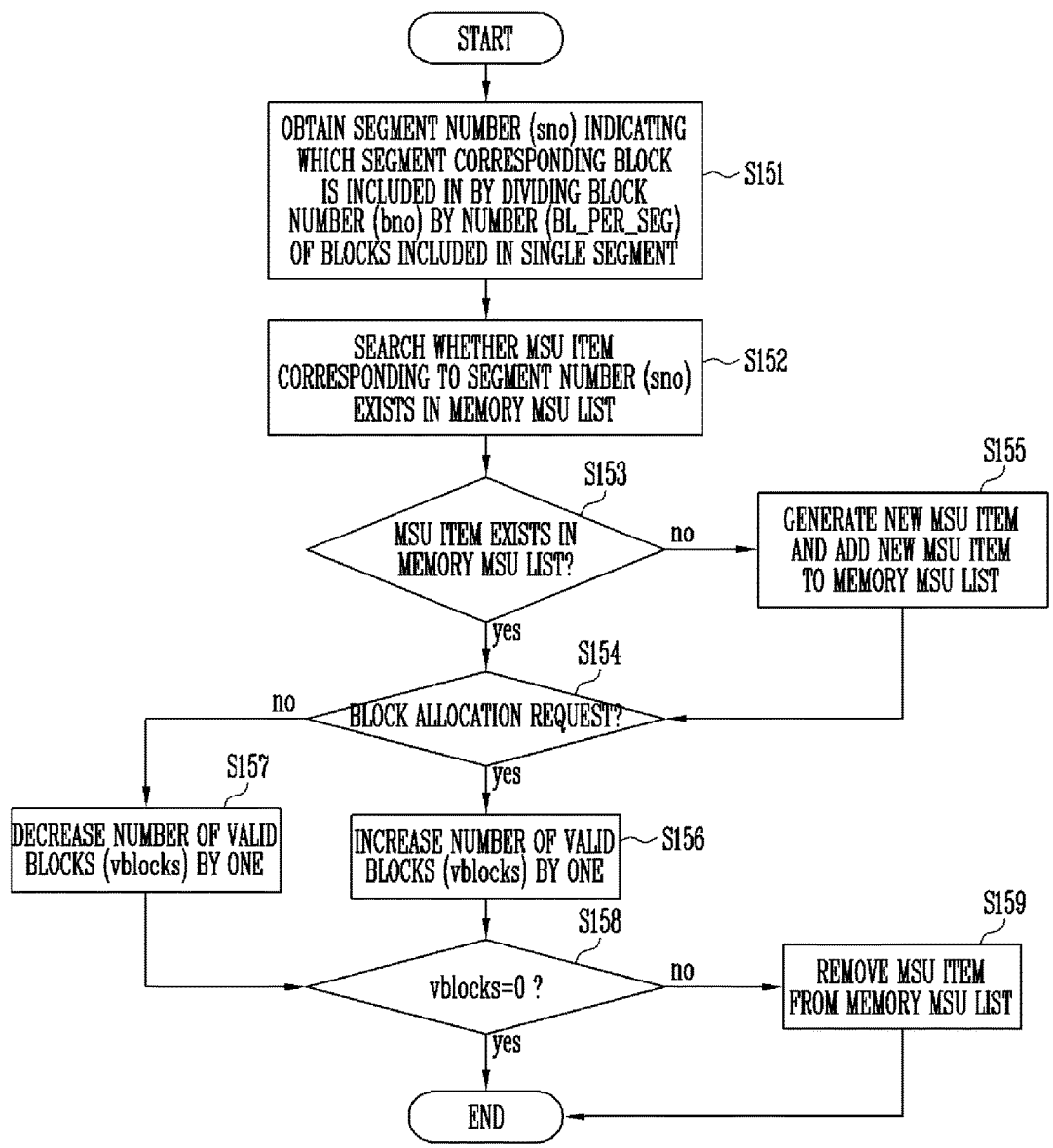

FIG. 15 is a diagram illustrating processes of correcting a memory MSU item by an MSU processing module according to an embodiment.

At step S151, a block number (bno) may be divided by the number (BL_PER_SEG) of blocks included in a single segment to obtain a segment number (sno) indicating in which segment the corresponding block is included. Hereinafter, at step S152, it may be searched as to whether an MSU item corresponding to the segment number (sno) exists in the in-memory MSU list.

At step S153, when it is determined that the MSU item corresponding to the segment number (sno) exists in the in-memory MSU list, step S154 may be performed. Otherwise, a new MSU item may be generated at step S155 and added to the in-memory MSU list. The new MSU item may be set so that a segment number field value thereof may be set to the segment number (sno) and a field number of valid blocks may be set to 0.

Whether or not the MSU item corresponding to the segment number (sno) exists may be determined depending on the data structure forming the in-memory MSU list. Tor example, when the in-memory MSU list is configured using the above-described circular doubly linked list one node may be selected first. Hereinafter, it may be checked through comparison whether a segment number field of the corresponding node coincides with the segment number (sno). When the segment number field and the segment number (sno) coincide with each other, it may be determined that the MSU stem corresponding to the segment number (sno) exists. Otherwise, the same operations may be repeated on the next item. These operations may be repeated until the process flow proceeds back to the first checked node.

Subsequently, at step S154, it may be determined whether it is a block allocation request or a block deallocation request. As a result of determination, when it is the block allocation request, the number of valid blocks vblocks may be increased by one at step S156. When it is the block deallocation request, the number of valid blocks vblocks may be decreased by one at step S157.

Subsequently, at step S158, it may be determined whether the number of valid blocks vblocks is 0 (zero). When it is determined that the number of valid blocks vblocks is 0, it may be-unnecessary to maintain the corresponding MSU item. Therefore, the MSU item may be removed from the in-memory MSU list at step S159.

According to an embodiment, the MSU processing module 930 may turn the in-memory MSU list into an MSU list included at a checkpoint when the checkpoint is recorded. Therefore, MSU information that keeps changing according to block allocation/deallocation may be recorded in a predetermined storage module so as not to be lost.

Figure 16:
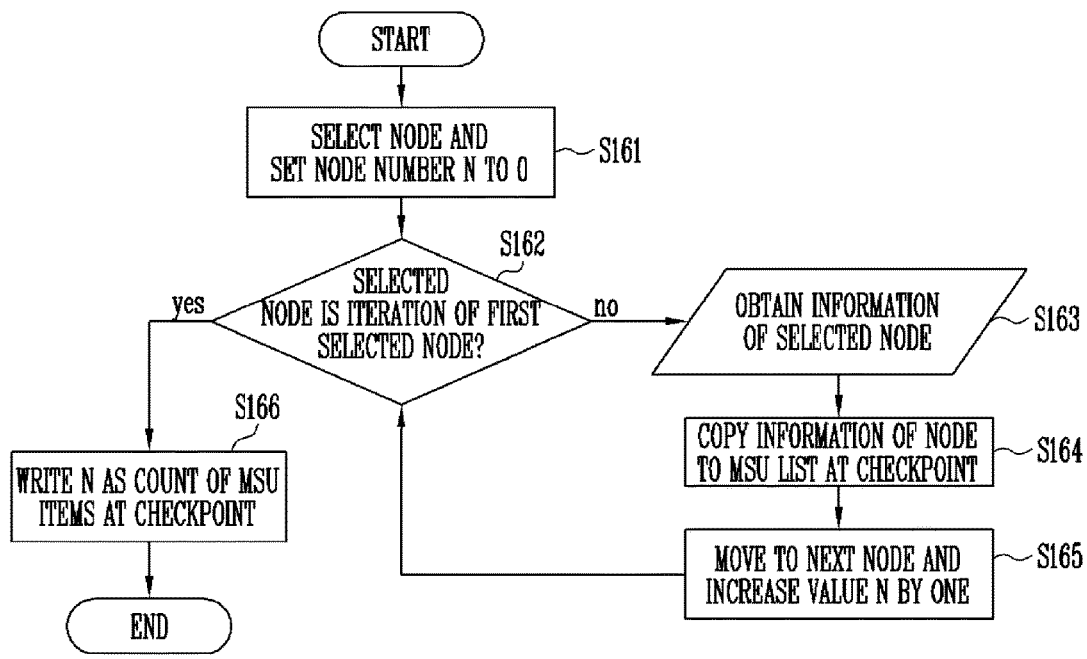

FIG. 16 is a diagram illustrating processes in which an MSU processing module stores a in-memory MSU list according Lo an embodiment.

At step S161, a node may be selected and a node number N may be set to 0 (zero). The node number N may be given to each node to differentiate from each other. Subsequently, at step S162, it may be checked whether the selected node is an iteration of the first selected node. When it is determined that the selected node is the iteration of the first selected node, it may be considered that all nodes are completely processed, and step S166 may be performed. At step S166, the node number N may be written as the count of the MSU items at the checkpoint.

On the other hand, when it is determined that the selected node is not the first selected node, information about the selected node may be obtained at step S163, and the information about the node may be copied to the MSU list of the checkpoint at step S164. Subsequently, at step S165, the process flow proceeds to the next node, the value N may be increased by one, and steps S163 to S165 may be repeated until the process flow proceeds back to the first selected node.

In other words, each of the items of the in-memory MSU list may be read to form the MSU list of the checkpoint, and the number of items of the MSU list of the checkpoint may be recorded in the checkpoint.

Subsequently, according to an embodiment, the metadata cleaning module 940 may perform a cleaning operation on an obsolete block generated by the metadata file.

In the present discourse, a block which is deallocated and becomes unnecessary may be referred to as an obsolete block. When corrections are made to the file contents, the log-structured file system may not record the corrections in the existing allocated block (in-place update) and allocate a new block to record the corrections, in the new block (out-of-place update). The existing block may be deallocated by the above-described block deallocation process, and the block that is deallocated and becomes unnecessary may be an obsolete block. The generation of the obsolete block may cause a valid block and an obsolete block, to coexist in one segment. More segments than the number of segments necessary to store the actual valid data may be classified as being in use. In other words, even when much empty space exists in the storage device, the number of segments available may be reduced.

Therefore, it may be necessary to collect and move valid blocks to an empty segment and perform deallocation with respect to the existing segment. These processes may be referred to as segment cleaning. The segment cleaning operation may be performed with reference to segment summary and segment usage.

According to an embodiment, since metadata as well as general data is also contained in a file and processed, a metadata file may also generate an obsolete block. Therefore, it may be necessary to perform the above-described cleaning operation on the metadata file.

According to an embodiment, the metadata cleaning module 940 may perform a cleaning operation on the metadata file when predetermined conditions are satisfied. More specifically, on the assumption that an 'M' number of MSU items form the in-memory MSU list and the metadata file is completely filled, when a minimum segment number N necessary to store the same becomes [(metadata file size/segment size)+1], if the condition M>KN is satisfied, the cleaning operation may be performed, where K is an arbitrary constant.

Alternatively, the, metadata cleaning module 940 may perform a cleaning operation when it is necessary to ensure storage space due to narrow available space.

When a cleaning operation is necessary, the metadata cleaning module 940 may perform an overwrite operation from first to last while maintaining the contents of the metadata file. In terms of operating characteristics of the log-structured file system, the contents of the metadata file may be moved to newly allocated segments, and the existing segments may be deallocated. Therefore, the MSU items forming the MSU list may be replaced and the length of the MSU list may be reduced.

Subsequently, according to an embodiment, the storage module 950 may include an inode, segment summary, segment usage, and metadata segment usage as well as the above-described general data and metadata.

Subsequently, according to an embodiment, the communication module 960 may allow for data transmission and reception between the data input/output module 910, the space management module 920, the MSU processing module 930, the metadata cleaning module 940 and the storage module 950, Finally, according to an embodiment, the control module 970 may control flow of data between the data input/output module 910, the space management module 920, the MSU processing module 930, the metadata cleaning module 940, the storage module 950 and the communication module 960. In other words, according to an embodiment, the control module 970 may control flow of data between a system 900 for storing metadata in the log-structure file system and an external device, or flow of data between respective components of the system 900 for storing metadata in the log-structured tile system, so that each of the data input/output module 910, the space management module 920, the MSU processing module 930, the metadata cleaning module 940, the storage module 950 and the communication module 960 may perform an inherent function.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic-medium, such as a hard disk, a floppy disk and a magnetic tape, an optical recording medium, such as a CD-ROM and a DVD, a magneto-optical medium, such as a floptical disk, and a hardware device specially configured to store and execute program commands, such as a ROM, a RAM, a flash memory and the like. The program command includes, for example, a high-level language code that can be executed by a computer using an interpreter or the like, as well as a machine code generated by a compiler. The hardware devices can be configured to operate using one or more software modules in order to perform the processing according to the present disclosure, and vice versa.

In the foregoing discussion, although the present disclosure has been described in connection with the specific matters, such as the specific components, the exemplary embodiments, and the drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the aforementioned, embodiments, and the appended claims and what are modified equally or equivalently thereto will be considered to fall within the scopes of the present disclosure.

According to an embodiment, an in-place update may not be performed when metadata as well as data is stored in a log-structured file system, and the number of necessary blocks may be reduced when the metadata is recorded.

What is claimed is:

1. A method of storing metadata of a log-structured file system in a storage space divided into segments each of which includes blocks, the method comprising:
   receiving a block management request signal including information about a block number and indicating whether it is an allocation request or a deallocation request for a block;
   calculating a segment number of one of the segments to which the block belongs with reference to the block number;
   obtaining a metadata segment usage (MSU) item corresponding to the segment number, wherein the metadata segment usage (MSU) item includes information about a segment number and a number of valid blocks; and
   increasing the number of valid blocks of the metadata segment usage (MSU) item by one when the block management request signal corresponds to the allocation request, and decreasing the number of valid blocks of the metadata segment usage (MSU) item by one when the block management request signal corresponds to the deallocation request.

2. The method of claim 1, wherein the segment number is calculated by dividing the block number by a number of blocks included in a single segment.

3. The method of claim 1, wherein, the metadata segment usage (MSU) item corresponding to the segment number is obtained by searching a metadata segment usage (MSU) list.

4. The method of claim 3, wherein a new metadata segment usage (MSU) item corresponding to the segment number is generated and added to the metadata segment usage (MSU) list when the metadata segment usage (MSU) item corresponding to the segment number does not exist in the metadata segment usage (MSU) list.

5. The method of claim 4, wherein a segment number of the new metadata segment usage (MSU) item is set to the segment number and the number of valid blocks is set to 0 (zero).

6. The method of claim 3, further comprising removing the metadata segment usage (MSU) item from the metadata segment usage (MSU) list when the number of valid blocks is determined as 0.

7. The method of claim 3, further comprising, when M metadata segment usage items constitute the metadata segment usage (MSU) list and N segments are used to store a metadata file, performing a block cleaning operation when M is greater than N times K, where K is a predetermined coefficient.

8. A system for storing metadata of a log-structured file system, the system comprising:
   a data input/output module transferring a block allocation request or a block deallocation request when receiving a data write request or a metadata write request;
   a space management module processing the block allocation or deallocation request after determining whether the block allocation or deallocation request is made in response to the data write request or the metadata write request when receiving the block allocation or deallocation request from the data input/output module; and
   a metadata segment usage processing module updating segment information corresponding to a metadata file whenever the space management module processes allocation or deallocation of a block in response to the metadata write request, wherein the data input/output, module transfers a segment summary item including an inode number and an inode block number when transferring the block allocation request to the space management module, and transfers a number of a block to deallocate when transferring the block deallocation request.

9. The system of claim 8, wherein the space management module determines whether the block allocation or deallocation request is made in response to the data write request or the metadata write request with reference to the inode number of the segment summary from the data input/output module.

10. The system of claim 9, wherein the space management module allocates a block in a segment for a general file when the inode number is for a data file when processing the allocation of the block, and allocates a block in a segment for a metadata file when the inode number is for the metadata file.

11. The system of claim 10, wherein the space management module is configured to:
increase a number of valid blocks of the segment by one when allocating the block in the segment for the general file, and
transfer a number of the block in the segment for the metadata file and information indicating that the block is allocated to the metadata segment usage processing module when allocating the block in the segment for the metadata file.

12. The system of claim 9, wherein the space management module is configured to:
decrease a number of valid blocks of the segment to which a block to deallocate belongs by one when the inode number is for the data file when processing the allocation of the block, and
transfer a number of a deallocated block and information indicating that the block in the segment for the metadata file is deallocated to the metadata segment usage processing module when the inode number is for the metadata file.

* * * * *